(No Model.)
H. C. ROBINSON.
CHURN DASHER.
No. 267,258.
Patented Nov. 7, 1882.
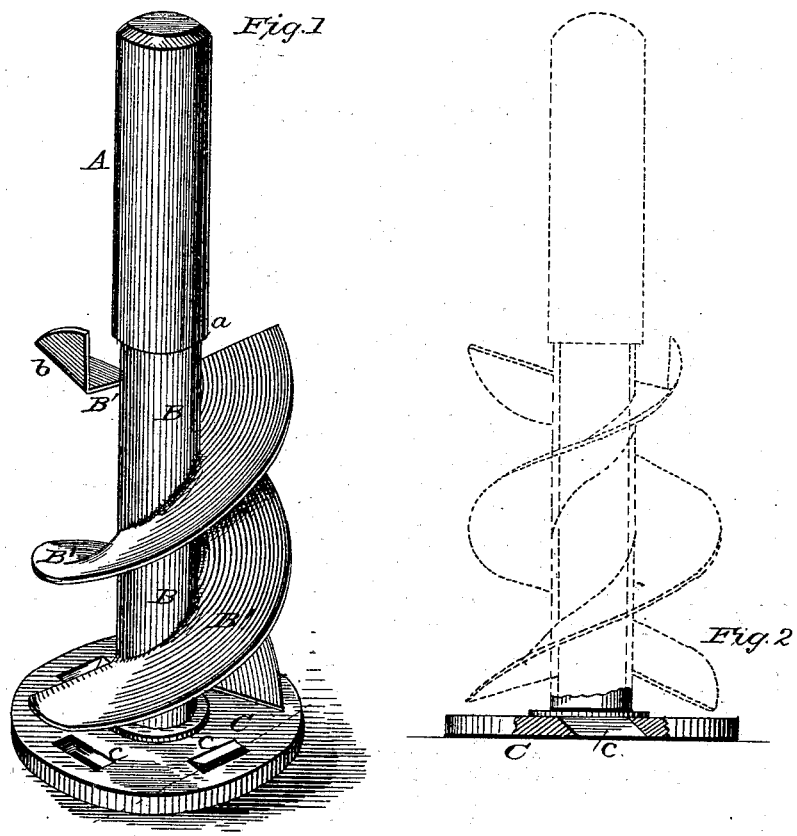
WITNESSES:
Fred. G. Dieterich
Jno. A. Madigan
Hiram C. Robinson
INVENTOR.
by Louis Bagger & Co,
ATTORNEYS.

UNITED STATES PATENT OFFICE.

HIRAM C. ROBINSON, OF DE SOTO, ILLINOIS.

CHURN-DASHER.

SPECIFICATION forming part of Letters Patent No. 267,258, dated November 7, 1882.

Application filed August 15, 1882. (No model.)

*To all whom it may concern:*

Be it known that I, HIRAM C. ROBINSON, of De Soto, in the county of Jackson and State of Illinois, have invented certain new and useful Improvements in Churn-Dashers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved churn-dasher, and Fig. 2 is a detail view of the same.

Similar letters of reference indicate corresponding parts in both the figures.

My invention contemplates certain improvements in vertical reciprocating churn-dashers, as will be hereinafter more fully described, and pointed out in the claim.

In the accompanying drawings, the letter A indicates the staff of the churn-dasher, which is reduced at its lower part, forming a shoulder or offset, *a*. On the lower reduced part rotates a sleeve, B, impinging at its upper and lower end upon the shoulder *a* and the disk C. Upon the sleeve B are spiral flanges B', running the full length of the sleeve. The disk C has beveled slots *c*, as shown in section in Fig. 2 of the drawings. The upper end of either one or more of the spiral flanges is turned upward parallel with the staff, as shown at *b*.

In operating the dasher it will be seen that on the downstroke the milk or cream will get an oblique direction by passing through the beveled slots *c*, and striking the spiral flanges B' it will set them in rotating motion. On the upstroke the sleeve B, with its spiral flanges, will rotate in the opposite direction, thus causing a thorough and rapid agitation of the milk or cream, and causing a quicker separation of the butter from the buttermilk.

I am aware that churn-dashers involving the combination of a dasher-staff having a disk at its lower end and a rotary spirally-flanged head have been used before, nor do I claim such construction and combination, broadly; but

What I claim as my improvement, and desire to secure by Letters Patent of the United States, is—

The disk C, having beveled slots or openings *c*, as shown, and secured upon the lower end of the dasher-staff, in combination with the rotary sleeve B, having spiral flanges B'.

In testimony that I claim the foregoing as my own I have hereunto affixed my signature in presence of two witnesses.

HIRAM C. ROBINSON.

Witnesses:
 L. H. REDD,
 GEO. N. ALBON.